US010146494B2

(12) United States Patent
Kosinski, II et al.

(10) Patent No.: US 10,146,494 B2
(45) Date of Patent: Dec. 4, 2018

(54) SYSTEM AND METHOD FOR OPERATING A MULTIPLE DISPLAY ASSEMBLY

(71) Applicants: John Thomas Kosinski, II, River Rouge, MI (US); James Paul Farell, Canton, MI (US); Michael Dean Tschirhart, Ann Arbor, MI (US)

(72) Inventors: John Thomas Kosinski, II, River Rouge, MI (US); James Paul Farell, Canton, MI (US); Michael Dean Tschirhart, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/057,650

(22) Filed: Mar. 1, 2016

(65) Prior Publication Data
US 2017/0255441 A1 Sep. 7, 2017

(51) Int. Cl.
G06F 3/14 (2006.01)
G06F 3/147 (2006.01)
B60K 35/00 (2006.01)

(52) U.S. Cl.
CPC .......... G06F 3/1431 (2013.01); B60K 35/00 (2013.01); G06F 3/147 (2013.01); G06F 3/1423 (2013.01); G06F 3/1446 (2013.01); B60K 2350/106 (2013.01); B60K 2350/1028 (2013.01); B60K 2350/352 (2013.01); G09G 2354/00 (2013.01); G09G 2380/10 (2013.01)

(58) Field of Classification Search
CPC ............... G06F 3/1431; G06F 3/1423; G60K 2350/352
See application file for complete search history.

(56) References Cited

U.S. PATENT DOCUMENTS

| 2006/0125784 A1* | 6/2006 | Jang ...................... G06F 1/1616 345/156 |
| 2006/0164230 A1* | 7/2006 | DeWind ................. B60K 35/00 340/461 |
| 2006/0214871 A1 | 9/2006 | Iwamura |
| 2009/0128307 A1* | 5/2009 | Hentsch ................. B60K 35/00 340/425.5 |
| 2012/0268665 A1* | 10/2012 | Yetukuri ................ B60K 35/00 348/837 |
| 2013/0234951 A1* | 9/2013 | Kim ...................... G06F 1/1652 345/173 |
| 2014/0180537 A1* | 6/2014 | Ng .......................... G06T 13/00 701/36 |
| 2014/0285334 A1* | 9/2014 | Sano ...................... B60K 35/00 340/441 |

(Continued)

FOREIGN PATENT DOCUMENTS

WO 2015/008277 A1 1/2015

Primary Examiner — Lixi C Simpson
(74) Attorney, Agent, or Firm — Quinn IP Law

(57) ABSTRACT

A method, system, and display assembly are disclosed herein. The methods and system are directed to operating the multiple display assemblies included herein. The methods and system receive information, and based on the received information, engage at least a second display of the multiple display assembly. Also included herein is a multiple display assembly that incorporates an engager function to receive instruction instigate modes where a first display and a second display are provided.

5 Claims, 13 Drawing Sheets

(56) References Cited

U.S. PATENT DOCUMENTS

| | | | |
|---|---|---|---|
| 2015/0002991 A1* | 1/2015 | Vander Sluis | B60R 11/0235 361/679.01 |
| 2015/0019967 A1 | 1/2015 | Gutentag et al. | |
| 2015/0178034 A1 | 6/2015 | Penilla et al. | |
| 2016/0089979 A1* | 3/2016 | Bianchi | G06F 3/14 701/49 |
| 2016/0224222 A1* | 8/2016 | Mori | B60K 35/00 |

* cited by examiner

SYSTEM AND METHOD FOR OPERATING A MULTIPLE DISPLAY ASSEMBLY

BACKGROUND

Displays are employed to convey digital information via a lighted platform. The displays are installed in a variety of contexts and environments, such as televisions, advertisements, personal computing devices, and more commonly, in vehicles.

The standard display assembly includes display driving logic with various instructions to communicate to an array of lighting elements. The display driving logic communicates signals that instruct which of the lighting elements to illuminate, and a corresponding intensity and color (if available). The display assembly may be incorporated with various interface devices, such as keyboards, pointers, gaze trackers, head trackers, eye trackers, and the like.

In recent years, the displays have been incorporated with touch sensor capabilities. The touch sensors may be incorporated in the display itself, and when a user engages with the screen (i.e. through physical contact), a command is initiated. In situations where touch screens are implemented, a side interface button may also be provided.

The displays may be used to present a variety of information and types of applications. In some cases, the applications may be critical to the operation and engagement with a specific environment or context. For example, if a display is implemented in a vehicle's dashboard, the display may be employed to convey information about the vehicle's function and/or safety.

In other cases, the display may be employed to present information associated with an application not related to the operation or context in which the display is located. For example, in the situation which the display is implemented in a vehicle, the display may be employed for a variety of applications wholly unrelated to vehicles, driving, or being situated in a vehicle. For example, the display may be associated with an entertainment application, telephone/Internet messaging, general Internet browsing, or the like.

As displays become more robust, the displays being implemented switch between applications and graphical user interfaces (GUI) that are related to the display's environment, to applications/GUIs that are wholly unrelated. Further, as displays are also become more diverse in nature, the interfaces required for specific applications increases. An interface is defined as a method of interacting with a display or GUI.

SUMMARY

The following description relates to a multiple display assembly and an operation associated with the multiple display assembly.

A system for operating a multiple display assembly coupled to an electronic control unit (ECU), the multiple display assembly including a first display and a second display is provided herein. The system includes an information receiver configured to receive information from the ECU; a display processor configured to determine whether to set the multiple display assembly in a first mode or a second mode, the first mode being defined as only the first display being visible; and the second mode being defined as the first display and the second display being visible. The system further includes an information processor configured to communicate the determination to the multiple display assembly.

In another example, the display processor is further configured to determine whether to set the multiple display assembly's mode based on the received information indicating a new application is to be executed by the ECU.

In another example, the display processor is further configured to determine whether to set the multiple display assembly's mode based on interface data received with the received information.

In another example, the information receiver is further configured to receive information about a source of the received information; and the display processor is further configured to determine whether to set the multiple display assembly's mode based the source correlating to a predetermined relationship.

In another example, the source is defined information from a network-connected source.

In another example, the first mode is defined as the first display completely obscuring the second display, and the second mode is defined as the second display being engaged via the communication from the information processor, with the second display being moved to a visible location.

In another example, the moving of the second display occurs independently of a user instruction.

A method for operating a multiple display assembly coupled to an electronic control unit (ECU), the multiple display assembly including a first display and a second display is provided herein. The method includes receiving information from the ECU; determining whether the received information is associated with an engagement of the second display; and in response to the determination that the received information is associated with the second display, communicating an display orientation data signal instructing the multiple display assembly to cause the second display to be visible.

In another example of the method, the second display being visible is defined as a state in which the second display is moved from a state of being hidden to a state of being visible.

In another example of the method, the determination further comprises determining whether the received information is a new application, and the new application is correlated through a predetermined relationship to be presented via the second display.

In another example of the method, the determination further comprises determining whether the received information includes interface data, and the interface data is correlated through a predetermined relationship to be presented via the second display.

In another example of the method, the determination further comprises determining whether the received information is associated with a source, and the source is correlated through a predetermined relationship to be presented via the second display.

A multiple display assembly is disclosed herein. The assembly includes a first display electronically coupled to an electronic control unit (ECU); a second display electronically coupled to the ECU; and a multiple display engager configured to move the second display from a hidden state to a visible state in response to the multiple display assembly receiving a display orientation signal.

In another example, the display orientation signal is generated in response to a predetermined stimulus.

In another example, the predetermined stimulus is defined as a new application being initiated on the ECU.

In another example, the predetermined stimulus is defined as an interface of an application being executed on the ECU being correlated with a second display.

In another example, the predetermined stimulus is defined as data being received by the ECU from a source, the source being correlated to a presentation on the second display.

Further objects, features and advantages of this invention will become readily apparent to persons skilled in the art after a review of the following description, with reference to the drawings and claims that are appended to and form a part of this specification.

DETAILED DESCRIPTION

Figure 1A:
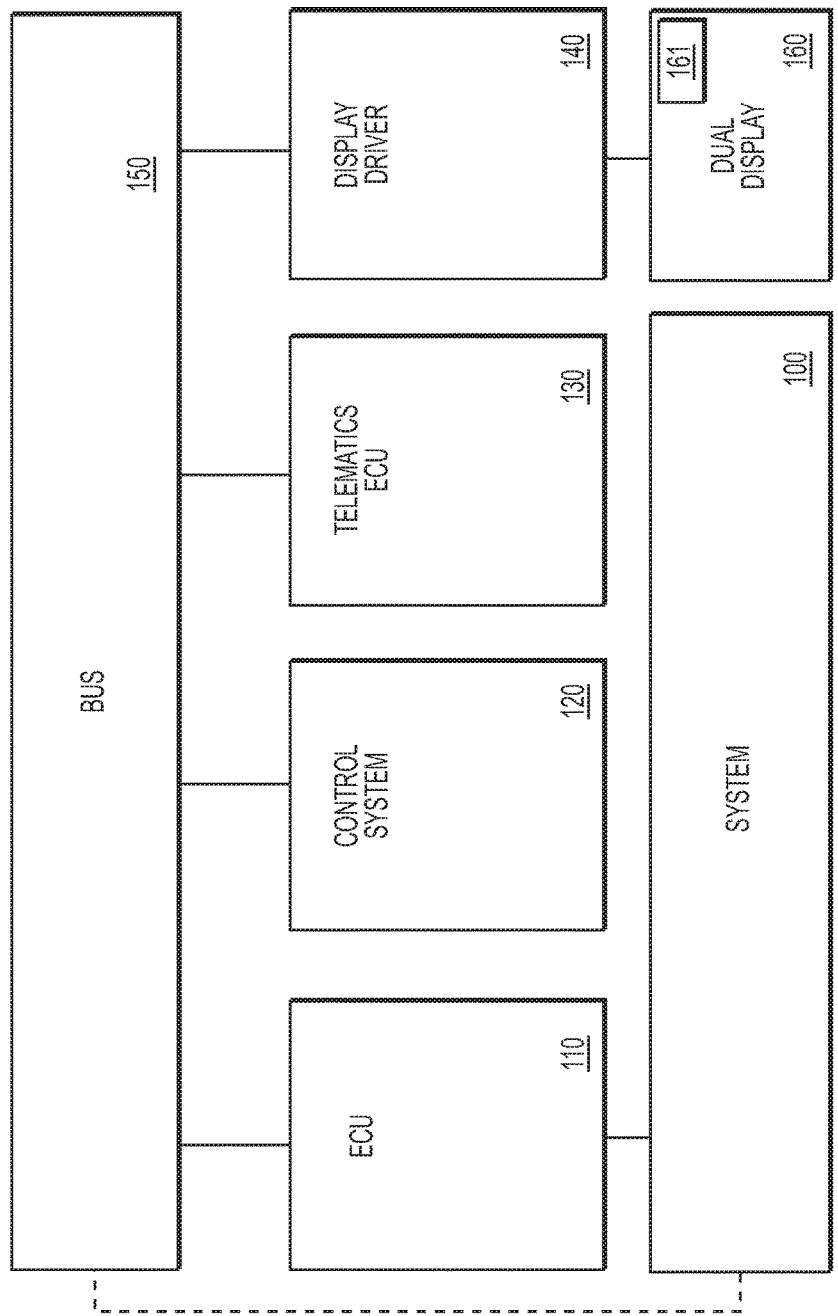
FIG. 1(a)-(d) illustrate an example of a system 100 level implementation of the aspects disclosed herein.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As explained in the Background section, displays convey image through a lighted medium. Digital information is communicated to the display with the information propagated in a variety of lighted patterns onto a display. As displays become more ubiquitous, their applications become more varied and numerous.

Applications that were once in an analog or non-digital setting, are now being translated to be viewed via digital displays. Examples may include vehicular controls, temperature settings, and the like. Further, critical information associated with an operation or a context may also be communicated via a digital display, such as the vehicle's speed, safety information, and the like.

Thus, as more information is being conveyed via a digital display, the need for more real estate on the display has also increased. However, displays are often limited due to physical constraints associated with an environment or context. For example, in the vehicular setting, the display is limited by the available space in a vehicle's dashboard area.

Disclosed herein are methods, systems, and apparatus (i.e. assemblies) for operating and providing a multiple display. The multiple display, which is shown in this application, as well as related applications, may serve to provide content on a first display, a second display, or both. By employing the concepts disclosed herein, the multiple display becomes selectively implemented based on a predetermined application and/or need.

In this disclosure, numerous references are made to a dual display (i.e. dual display assembly). However, one of ordinary skill in the art may understand that the dual display is employed for exemplary purposes, and thus, when dual display is used, a number greater than two may be applied to the number of displays.

Figure 1B:
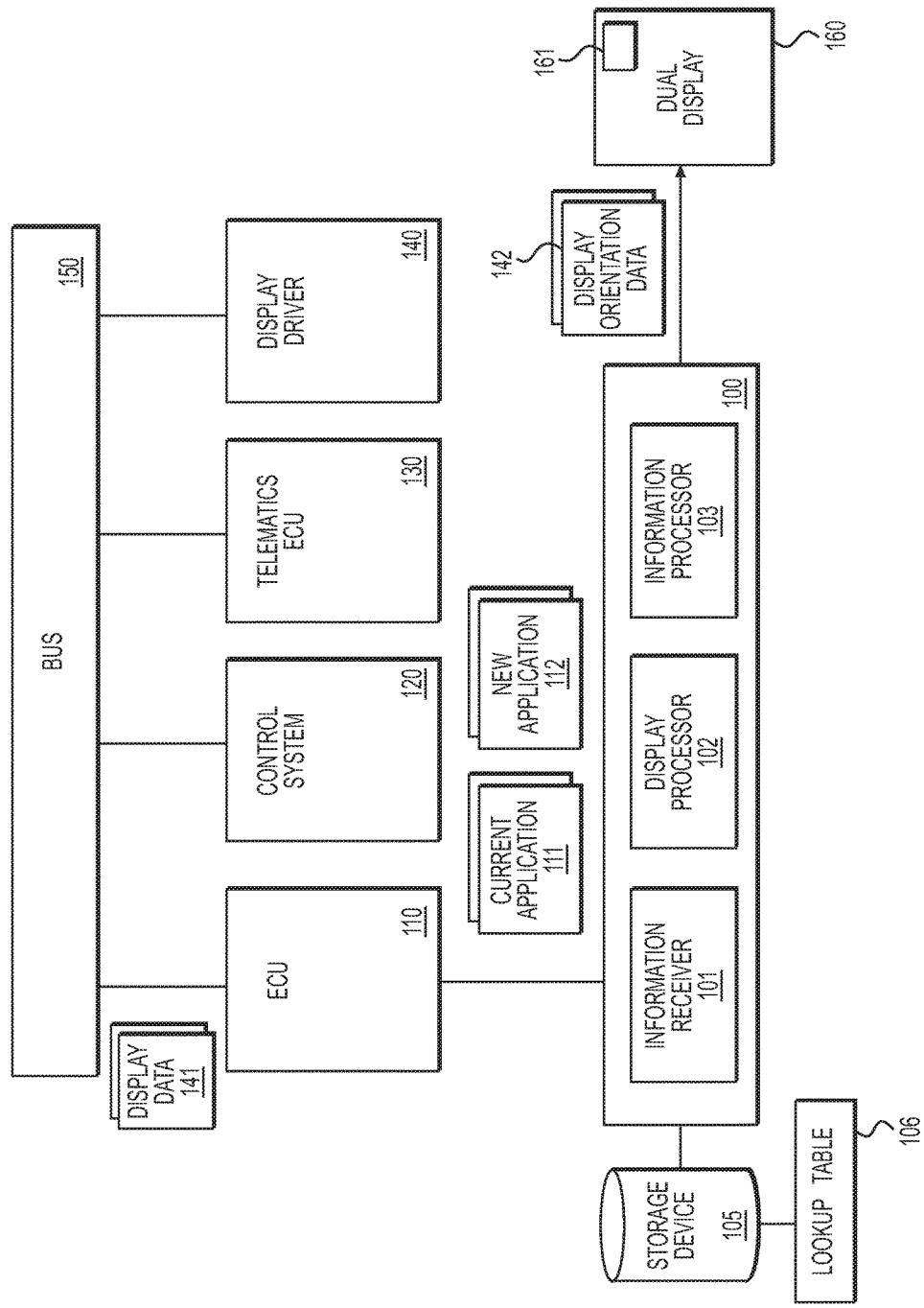
Figure 1C:
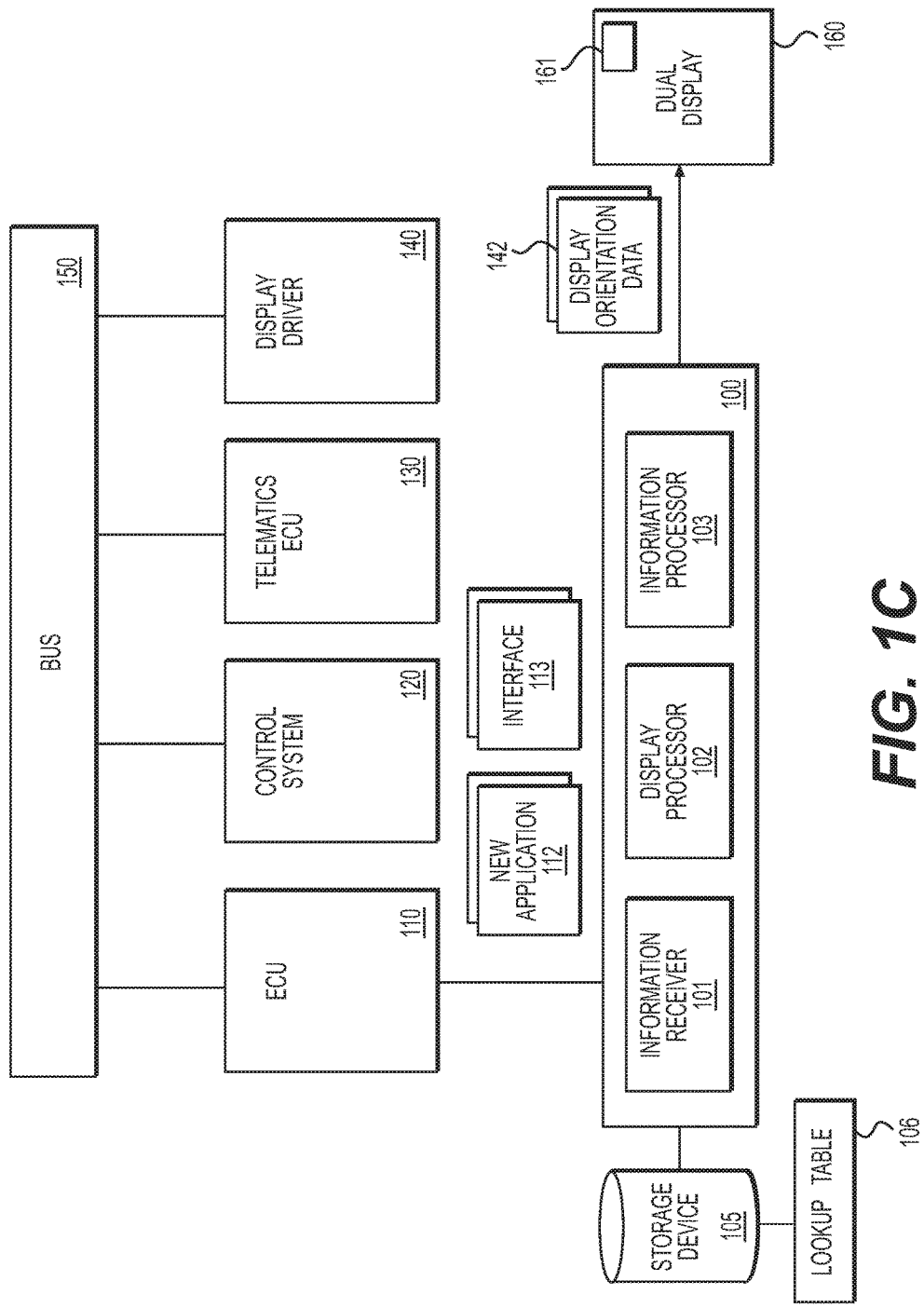
Figure 1D:
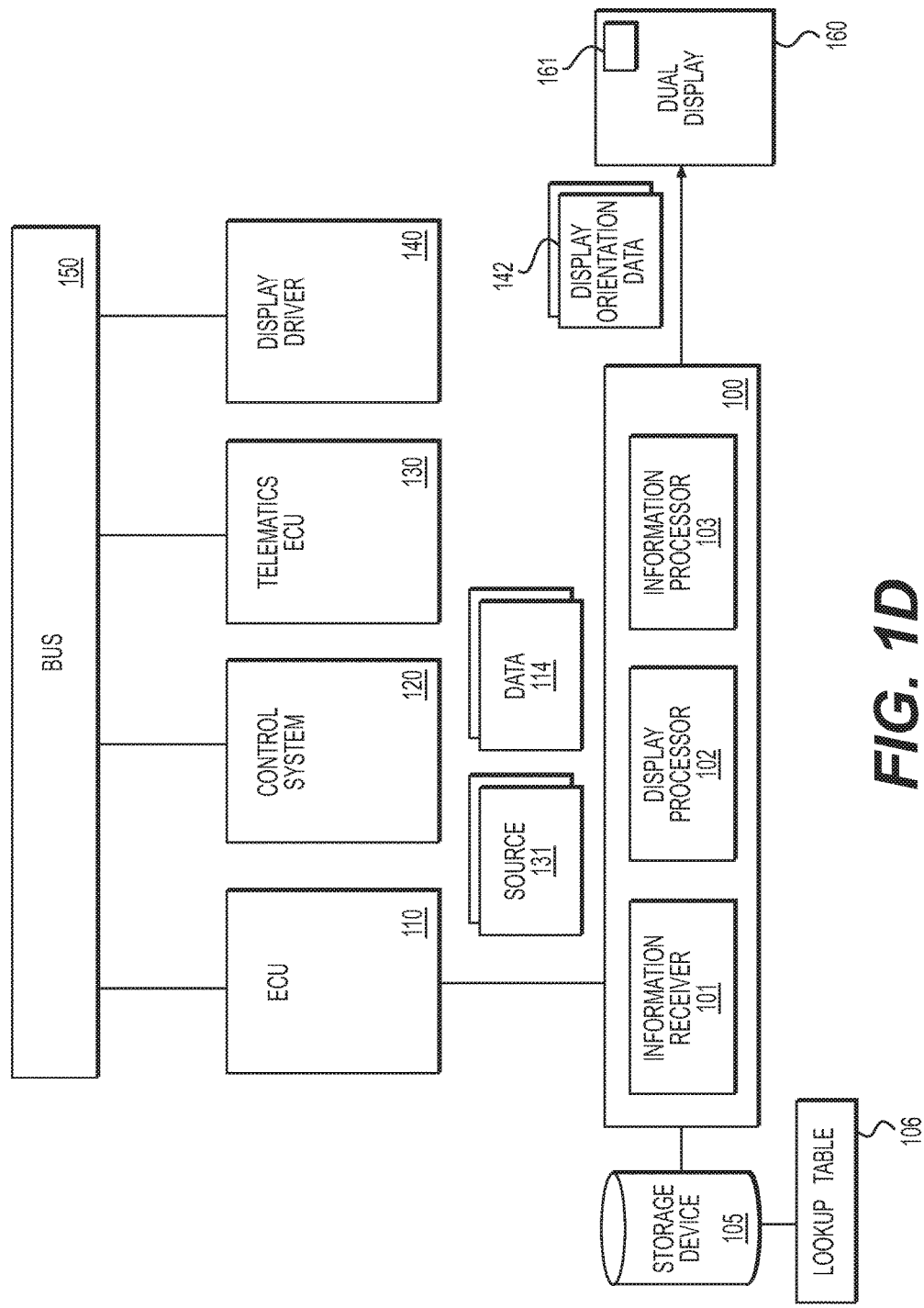

FIGS. 1(a)-(d) illustrate an example of a system 100 level implementation of the aspects disclosed herein. Specifically, system 100 interfaces with an electronic processing system in which various systems and display hardware are implemented with. Generally, FIG. 1(a) illustrates a system level diagram of the important components, while FIGS. 1(b)-(c) illustrate the systems shown in FIG. 1(a) with a variety of signals communicated between the various componentry.

While lines are shown connected to the various components, any method/technique known may be implemented to communicate between the signals. For example, the signals may be communicated directly via wires, wirelessly, or through a centralized network router. A bus 150 is shown for illustrate purposes to indicate that the various systems/components of FIGS. 1(a)-(d) are electrically communicating with each other.

As shown in FIGS. 1(a)-(d), a bus 150 allows signals to be propagated from the various connected peripheral devices, such as the electronic control unit (ECU) 110, a control system(s) 120, a telematics ECU 130, and the display driver 140. The inclusion of the four connected peripheral devices described above is exemplary. Thus, other known electronic systems and architectures may be employed with the system 100 described within. The bus 150 is a wired or wireless (or combination of both) conduit that allows the information to be shared with the various elements shown in FIGS. 1(a)-(d).

The ECU 110 is processor that facilitates instructions being communicated from the various components. For example, control logic associated with the operation of the control system 120, the telematics ECU 130, and the display driver 140 may be contained in the ECU 110.

Further, the control system 120 may represent various componentry/systems or sensors associated with the electronic system shown in FIGS. 1(a) and (b). One example is a vehicle (which will be shown in further figures below). In the vehicle, a sub-system control system 120 may exist for a variety of functions, such as safety, climate, doors/windows, entertainment, and the like. The control system(s) 120 interface with each of the sub-system. For example, if one of the sub-systems is associated with opening and closing a window, the ECU 110 may receive a signal of an up/down operation (from an interface device provided in the vehicle). Once the signal is received by the ECU 110, a command may be generated and propagated through the bus 150 to the control system 120 associated with the opening/closing of windows.

The telematics ECU 130 is configured to receive/send data from other systems not shown in FIGS. 1(*a*)-(*d*). In some situations, the other systems may be a network connection, satellite connection, a local wireless connection (i.e. a Bluetooth™, or similar sort of local network connection), or the like. The ECU 110 may employ the telematics ECU 130 to communicate with and receive data from a third-party service, such as, streaming Internet channels, global positioning satellites, a cloud-network connection, and the like.

The display driver 140 drives data to the dual display 160 (via display data 141). Digital information is received and is rendered via the dual display 160. Also shown in the dual display 160 is a dual display engager 161. The dual display engager 161 may activate (via a signal from system 100, via the bus 150 and other components), and either activate a dual display mode or a single display mode.

As shown in FIG. 1(*b*), a system 100 for operating a dual display device 160 is explained in a sample operation of a variety of signals propagating to and from system 100 to the various components shown. The setup in FIG. 1(*b*) is similar to the setup shown in FIG. 1(*a*); however, various signals are shown that are used to communicate between the various elements and components.

System 100 includes an information receiver 101, a display processor 102, and an instruction processor 103. Also shown is a storage device 105 which stores electronically a lookup table 106.

The information receiver 101 is configured to receive information from the ECU 110 (either directly, or via the bus 150). The information may be one of the following, the current application 111 being presented on the dual display 160. After which, a new application 112 may be requested to be presented on the dual display 160 as well. The new application 112 may run in a parallel fashion with the current application 111, or in another example, place the current application 111 in a background window, while placing the new application 112 in a foreground process.

Additionally, the source 131 of the new application 112 may also be received. The source 131 serves an indication of where the application was received from (or where it gets data from). For example, if the information associated with the new application 112 is sourced from a third-party source, such as a network or mobile device connected via the telematics ECU 130, this is indicated by source 131. This concept is further discussed in FIG. 1(*c*).

Figure 2:
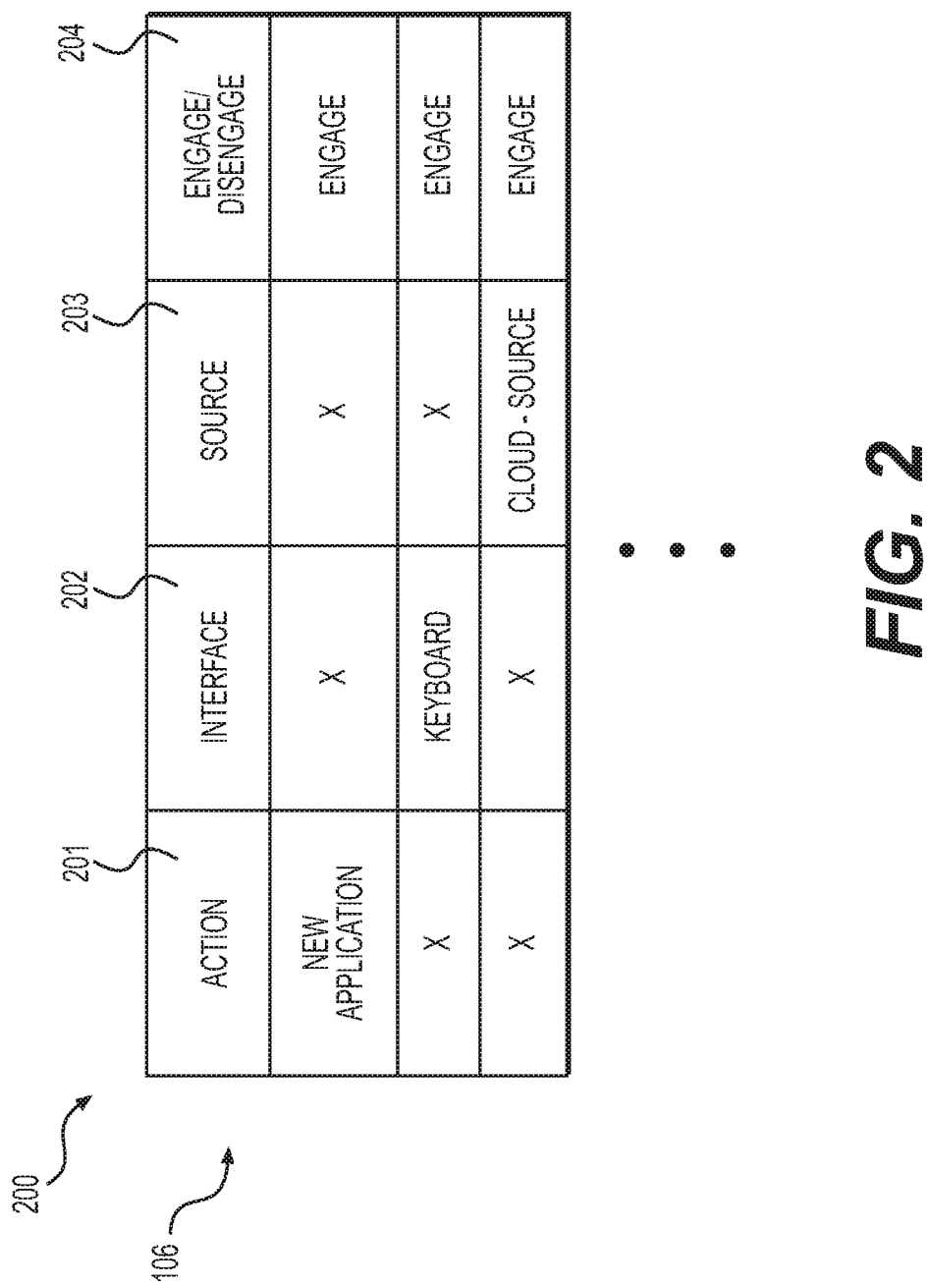
FIG. 2 illustrates an example lookup table employed with the various systems and methods disclosed herein.

The display processor 102, based on the information received, determines one or both of 1) whether to engage the second display (or dis-engage the second display) of the dual display 160; and 2) provide direction as to which content is displayed on a first display and what content is displayed on a second display. The display processor 102 may incorporate various techniques to make this determination, such as employing a lookup table 106 (stored on storage device 105). A sample lookup table 106 is shown in FIG. 2. Specifically, the decision as to whether to engage or dis-engage the dual display 160 (i.e. activate option 161) may be retrieved from the lookup table 106.

Referring to FIG. 2, a sample 200 of a lookup table 106 is depicted. The sample 200 is purely exemplary, and thus, an implementer of system 100 may customize the lookup table 106 based on a need or preference. As shown, the sample lookup table 200 includes the following fields: an action 201, an interface 202, a source 203, and whether to engage 204.

The sample lookup table 200 may be used with the various examples and operations of system 100 explained below. Specifically, field 204 discusses the concept of engaging a second display. By engaging the second display, this means that the second display is moved from a hidden or obscured view, to a visible view. This may be accomplished through various techniques. For example, a second display or a hidden display may be obscured by a primary (or first display). The second/hidden display may be in a slot and mechanically engaged to move to a visible location.

The instruction processor 103 is configured to communicate the display orientation 142 to either the dual display 160 directly, or to other components (such as the ECU 110 and bus 150). The display orientation 142 is used to indicate whether the dual display 160 is in single display mode and/or dual display mode. Accordingly, the display data 141 may also use this information to determine which display to drive data to.

Figure 3:
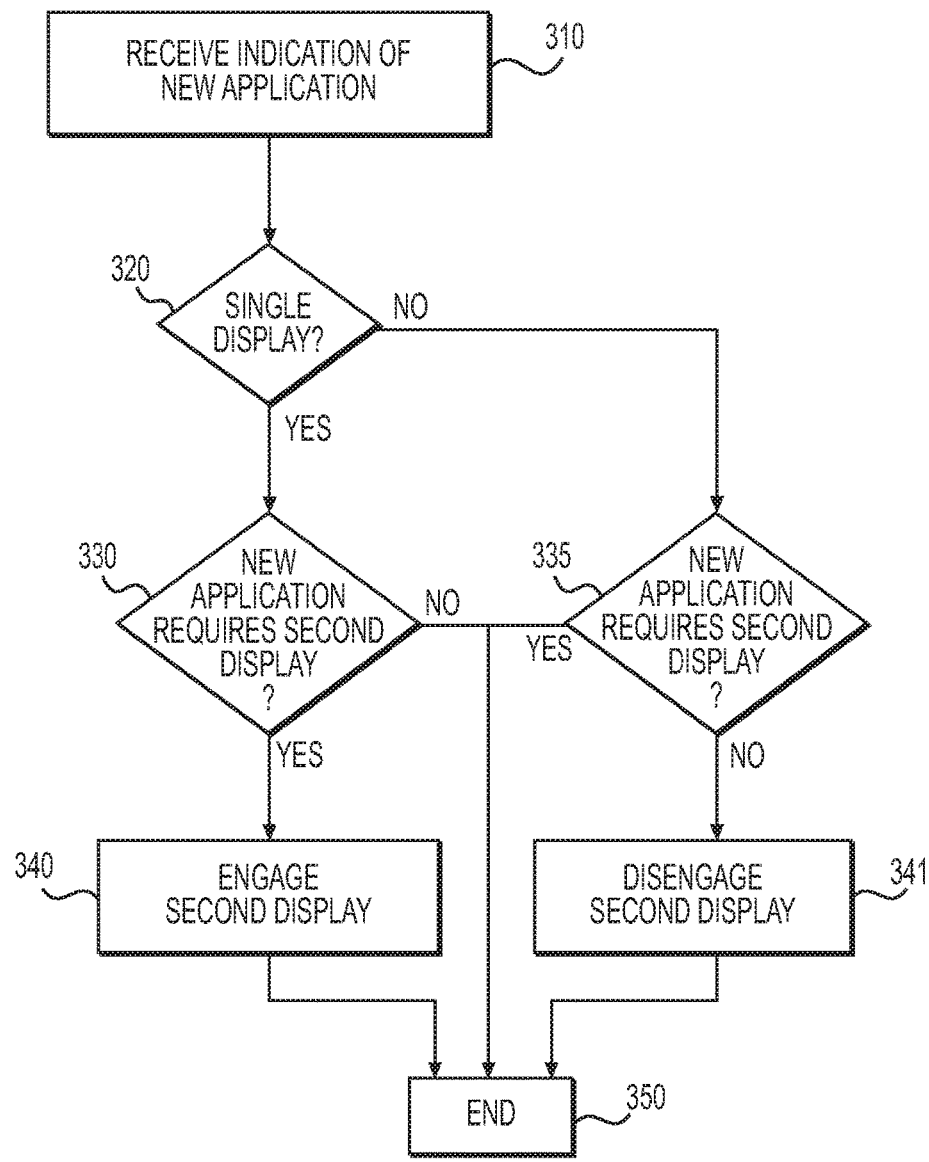
FIG. 3 illustrates an example method employing an operation of the system shown in FIG. 1(b).

A first method 300 explaining the concepts of the operation of system 100 in FIG. 1(*b*) is shown in FIG. 3.

In operation 310, an indication is received of a new application to be executed via a dual display assembly. For example, in the vehicular context, a user may wish to turn on their infotainment system.

In operation 320, a determination is made as to whether the current mode of the dual display is in single display mode. As shown in some of the examples below, the dual display assembly discussed herein is capable of showing one screen, or engaging a second screen along with the first screen. The decision to engage the second screen is based on signals associated with the various examples shown in FIGS. 1(*b*)-(*d*). Thus, a user is not required to activate a function engaging, or not engaging the second screen.

If the determination in operation 320 is yes, the method 300 proceeds to the determination in operation 330. In operation 330, a determination is made as to whether the new application requires a second display. If yes, the method 300 proceeds to operation 340, in which a second display is presented to the viewer. If no, the method 300 proceeds to end 350, and no change is made to the display.

In operation 335, as explained with the determination in operation 320, the dual display is in a mode where at least two displays are being presented to the viewer. Thus, in operation 335, a determination is made as to whether the new application requires a second display. If yes, nothing changes, and the dual display remains with two displays being presented (see operation 335 with the line to end 350).

In no, the method 300 proceeds to operation 341. In operation 341, the second display is disengaged. I.e., if the second display is being presented to the viewer, the second display is automatically moved to a position of non-visibility to said viewer.

Figure 6A:
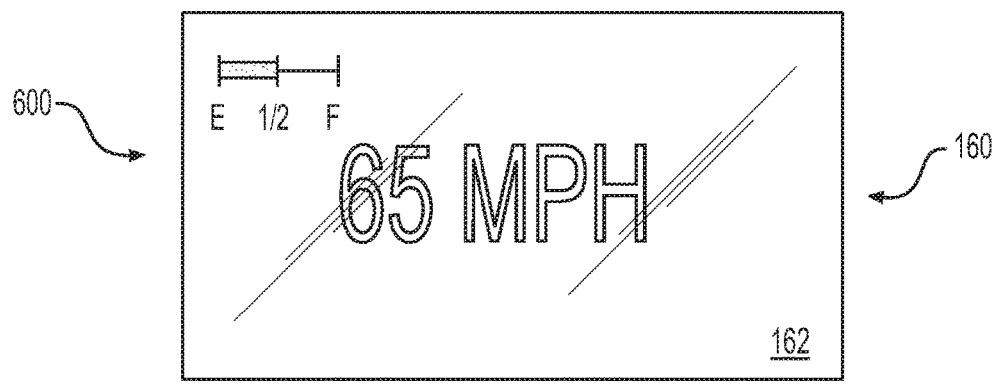
FIGS. 6(a) and (b) illustrate an example scenario of a dual display employing the system of FIG. 1(b) and the method of FIG. 3.
Figure 6B:
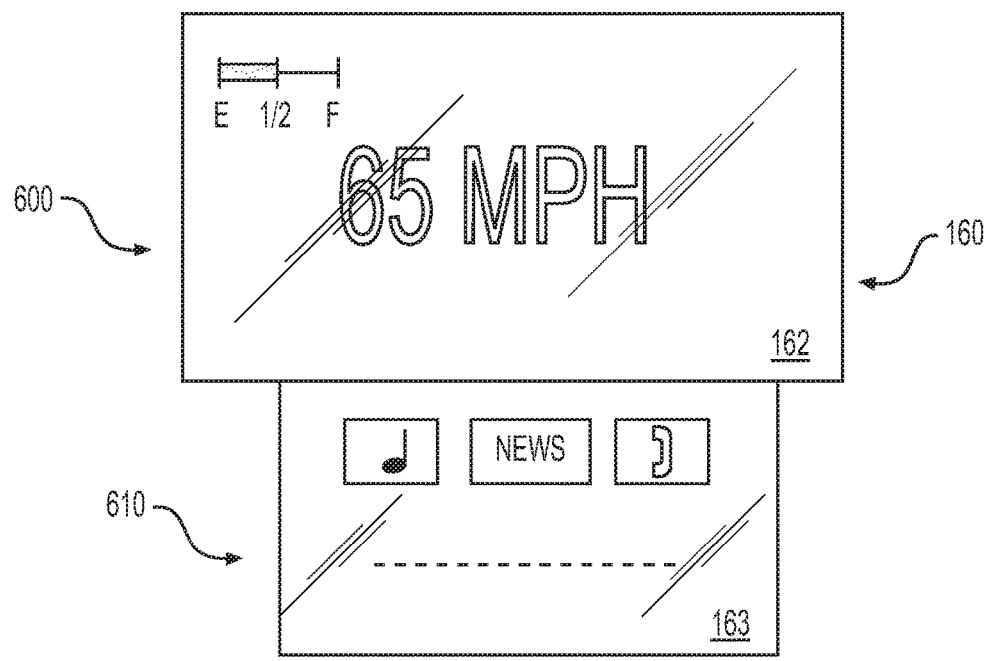

FIGS. 6(*a*) and (*b*) illustrate an example of system 100, and specifically implementing a case employing the ideas discussed with method 300.

Referring to FIG. 6(*a*), a screen 161 is shown on a dual display assembly 160. The dual display assembly 160 includes a first screen 162 and a second screen 163 (which is not shown in FIG. 6(*a*)). The second screen 163 is not shown because the second screen is in a dis-engaged orientation (i.e. not visible to a viewer/user).

In FIG. 6(*b*), the second screen 163 is engaged. In the use case shown in FIGS. 6(*a*) and (*b*), the dual display 160 is previously only showing a standard information screen 600 associated with standard information provided with the operation of a vehicle. For example, as shown, screen 600 displays a fuel indicator and speed.

In the transition from FIG. 6(*a*) to 6(*b*), a user selects an execution of an infotainment application (shown by screen 610). Thus, without any sort of action taken by a user/ viewer, the second display 163 becomes engaged (i.e. visible to a user and in a non-hidden orientation). For example, a mechanical motor may be configured to slide or make available the second display 163. As such, the original screen 600 (showing vehicle operation information) is maintained on display 162, while the infotainment screen 163 is shown on the second display 163.

Thus, when a system (such as those shown in FIG. 1(*a*)) are presented with a new application to display via a dual display 160, the aspects disclosed herein may be configured to present those new applications on a newly available (and previously hidden) display (i.e. second display 163).

FIG. 1(*c*) illustrates another example implementation of system 100. Referring to FIG. 1(*c*), a new application is initiated on the dual display 160. The new application is represented by new application data 112 (which is received via information receiver 101).

The display processor 102 may receive the new application 112, as well as interface data 113 associated with the new application, and propagate a display orientation data 142 to the dual display 160. Correspondingly, in cases in which the dual display 160 employs a secondary display, the dual display engager 161 may be initiated, and as such, a second display may protract (i.e. change from a hidden state to a shown state). The act of protracting may occur in an automatic function based on the interface being associated with the new application 112.

The actual interface (for example, a touch pad, a key board, a set of icons, or the like), and the decision as to whether to include an interface may be correlated and stored via lookup table 106. Thus, the interface associated with the new application may be presented on the secondary display.

Figure 4:
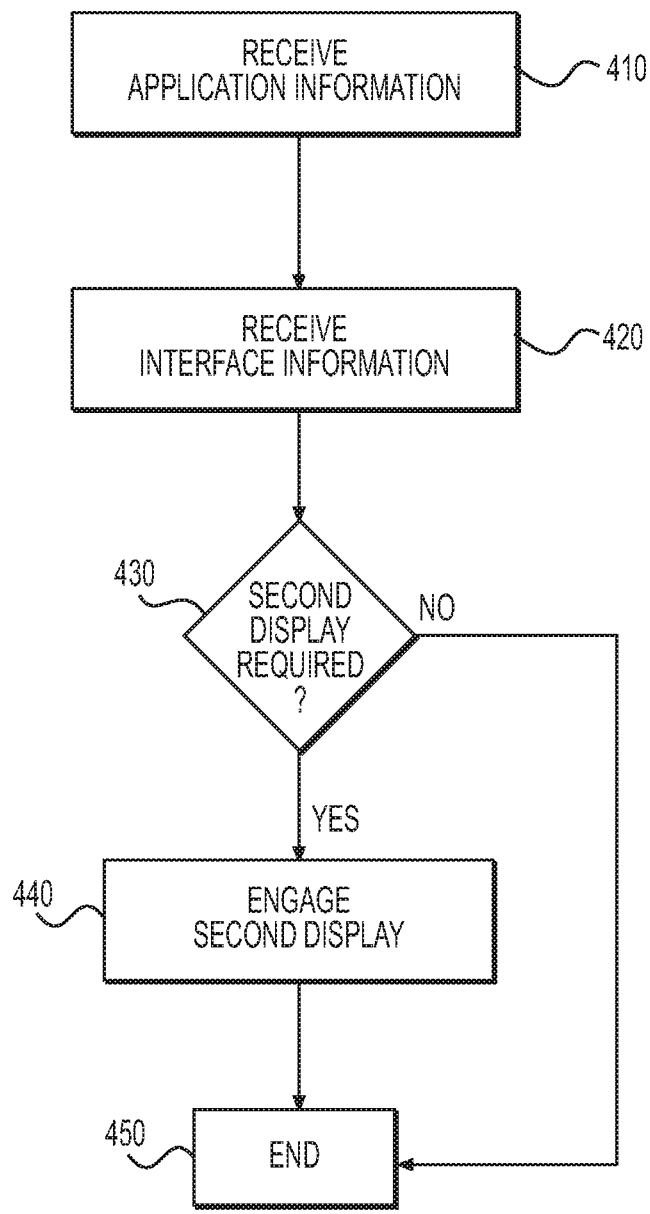
FIG. 4 illustrates an example method employing an operation of the system shown in FIG. 1(c).

A second method 400 explaining the concepts of the operation of system 100 in FIG. 1(*c*) is shown in FIG. 4.

In operation 410, the application information is received. For example, when a user engages or selects an application to execute or run through a system associated with the dual display, the information association with this application is received.

In operation 420, the interface associated with this received application is retrieved. As shown in FIG. 2, certain applications may be associated with specific interfaces. In operation 430, a determination is made as to whether a second display is required. The lookup table shown in FIG. 2 illustrates how specific interfaces and/or applications may be associated with a second display. If no, the method 400 proceeds to operation 450.

If a second display 430 is required, the second display is automatically presented to a viewer and/or display (as explained in various example, the second display is normally hidden when not engaged or required).

Figure 7A:
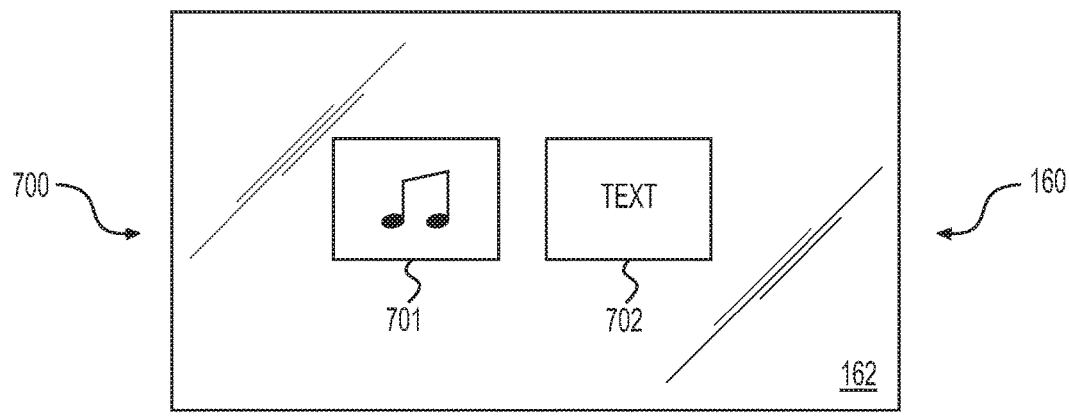
FIGS. 7(a)-(c) illustrate an example scenario of a dual display employing the system of FIG. 1(c) and the method of FIG. 4.
Figure 7B:
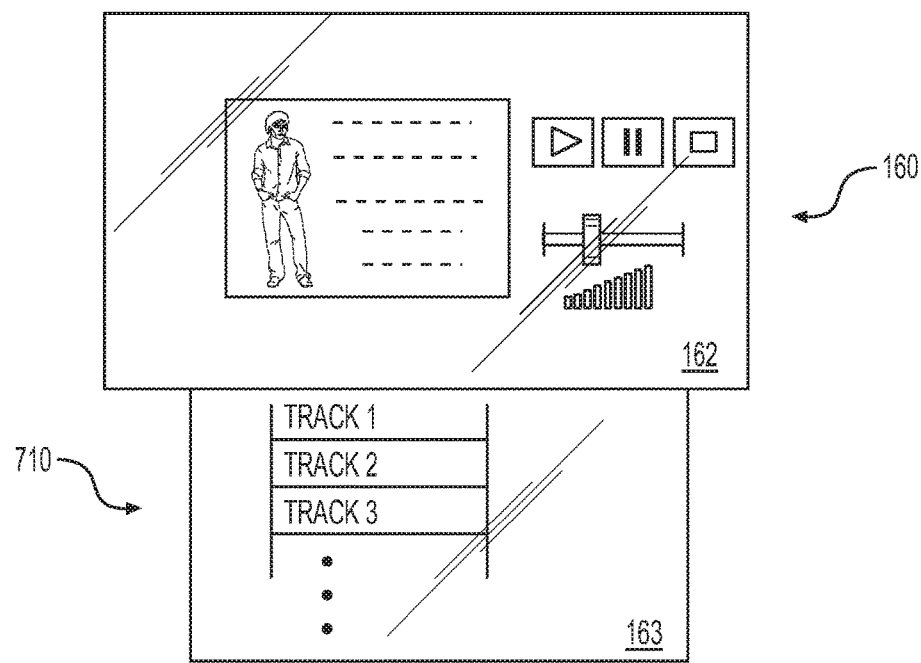
Figure 7C:
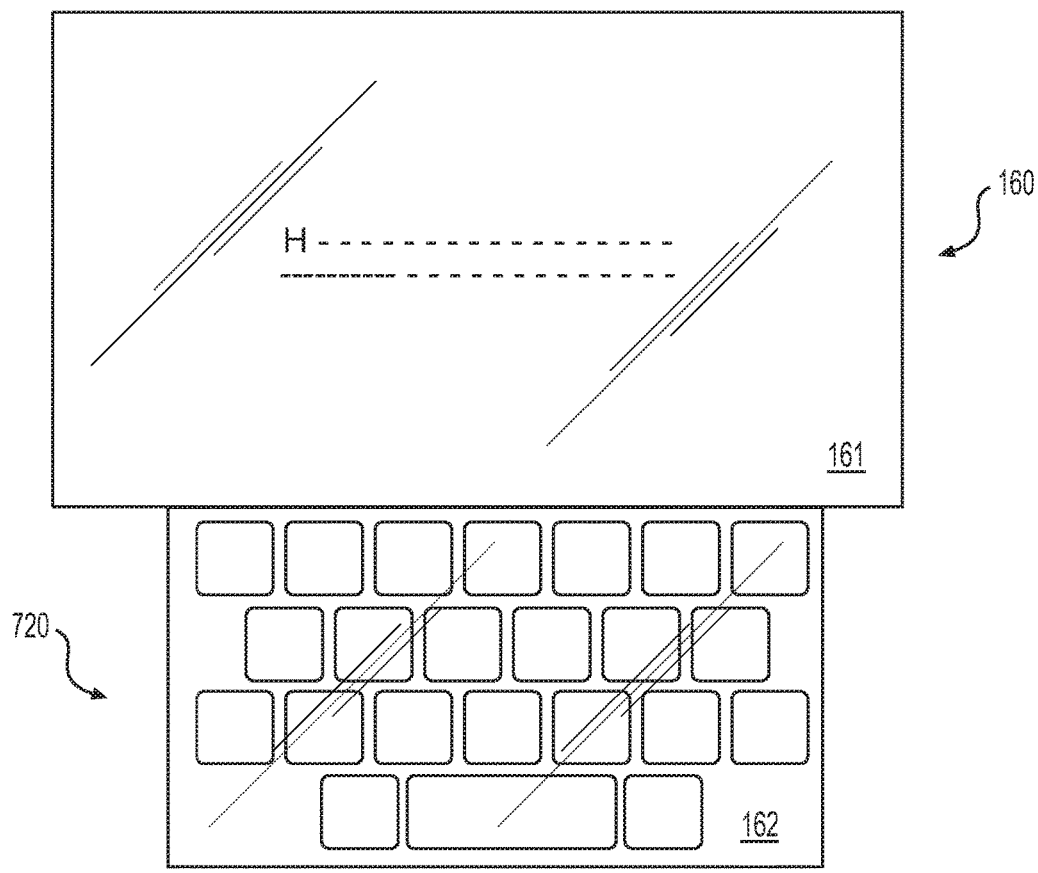

FIGS. 7(*a*)-(*c*) illustrate examples of a variety of interfaces capable of being employed with the system 100 or method 400. In FIG. 7(*a*), the second display 163 is hidden (i.e. in a disengaged state). The second display 163 is showing a screen which shows two different applications available for selection, a music application 701 and a texting application 702.

In response to the user selecting a first application (i.e. the music application 701), employing the concepts disclosed herein, a second display becomes engaged (i.e. not hidden), and a screen 710 on the second display becomes available to the user. As shown, the interface of screen 710 matches an interface configured to operate a musical application 701.

In FIG. 7(*c*), the text application 702 is engaged. Similar to the above, an interface associated with screen 720 is presented on a screen that is engaged (i.e. not hidden) to the user/viewer via display 163. Specifically, in the case shown in FIG. 7(*c*), a keyboard (touch screen keyboard) is presented via display 163.

Thus, as explained above, the aspects disclosed herein allow a specific interface to be presented on the second display of a dual display in response the specific interface matching an application on a primary interface.

FIG. 1(*d*) illustrates another example implementation of system 100. As shown in FIG. 1(*d*), source data 131 is communicated from the ECU 110 to the system 100 (via the information receiver 101). The source data 131 is also provided with the data 114. The source data 131 indicates where the data 114 was provided from. The telematics ECU 130 may receive information from a specific source, for example, a cloud-network provider.

Once this source is identified, the display processor 102 may retrieve information (for example, lookup table 106), and identify that information from a specific source is to be shown/displayed via the second display of the dual display. The information processor 103 may communicate a display orientation data 142 signal to the dual display 160 (which has an engager 161, which is similar to the one explained above), and engage the second display of the dual display 160 based on a predetermined instruction to display information via the second display.

Figure 5:
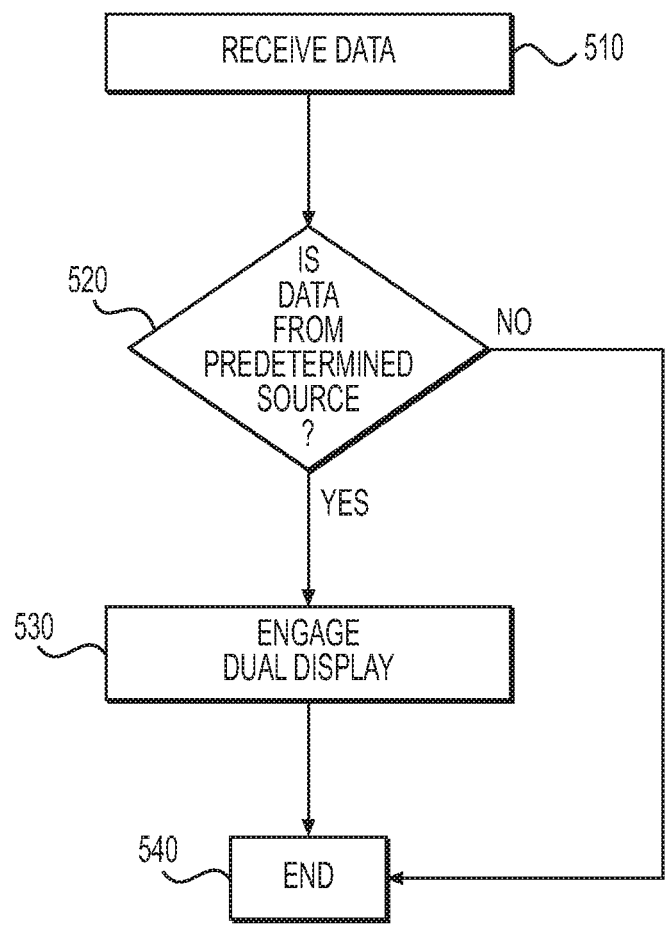
FIG. 5 illustrates an example method employing an operation of the system shown in FIG. 1(d).

FIG. 5 illustrates a method 500 explaining the concepts of the operation of system 100 in FIG. 1(*d*).

In operation 510, data is received from a source. For example, data can be received from different areas with a system, or from a secondary source such as a network, via a telematics ECU 130.

In operation 520, a determination is made as to whether the data is received from a predetermined source associated with a specific action to engage the second display of a dual display assembly. As shown in FIG. 2 in the exemplary lookup table 106, data being associated with a cloud-network source is correlated with an action to engage the second display.

In another example (not shown), the second display may be engaged in a manner to partially extend outwards. Thus, if the display is capable of extending to a location of 'X' distance, the second display may be extended to a distance of 50% X, and thus, be shown at a partial extension. In this case, the systems shown within may be configured to reconfigure the display to be driven and rendered on the partial amount of the second display extended. Thus, based on the available amount of the display shown, the second display may show a full image re-sized for the partially engaged second display.

If the determination in operation 520 is no, the method 500 proceed to end 540, and no action is taken.

If the determination in operation 520 is yes, the method 500 proceeds to operation 530, and a second display is engaged. Like similarly noted in other portions of this disclosure, a second display being engaged indicates that the display associated with the primary display (or first display) is now visible to a user/viewer.

Figure 8A:
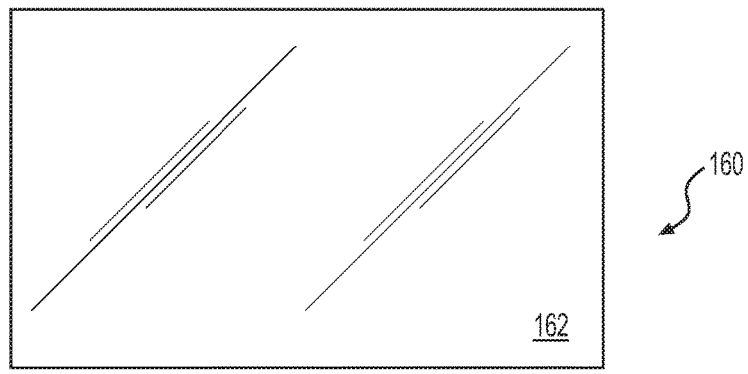
FIG. 8(a)-(c) illustrate an example scenario of a dual display employing the system of FIG. 1(d) and the method of FIG. 5.
Figure 8B:
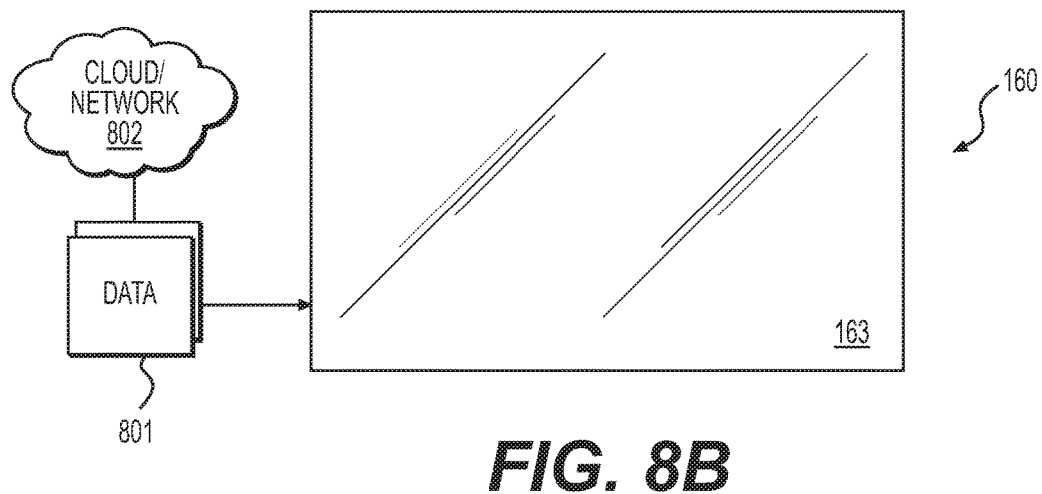

FIGS. 8(*a*)-(*c*) illustrate an example implementation of the system 100 described in FIG. 1(*d*) and method 500.

As shown in FIG. 8(*a*), a first display 162 of a dual display 160 is shown. As explained, the second display 163 is hidden (i.e. behind the first display 162 and configured to mechanically move without user instruction or engagement to a visible state). In FIG. 8(*b*), data 801 is received, and sourced from a cloud/network 802. As shown in FIGS. 1(*a*)-(*b*), the data 801 may be sourced from an ECU 110 and specifically from a telematics ECU 130.

Figure 8C:
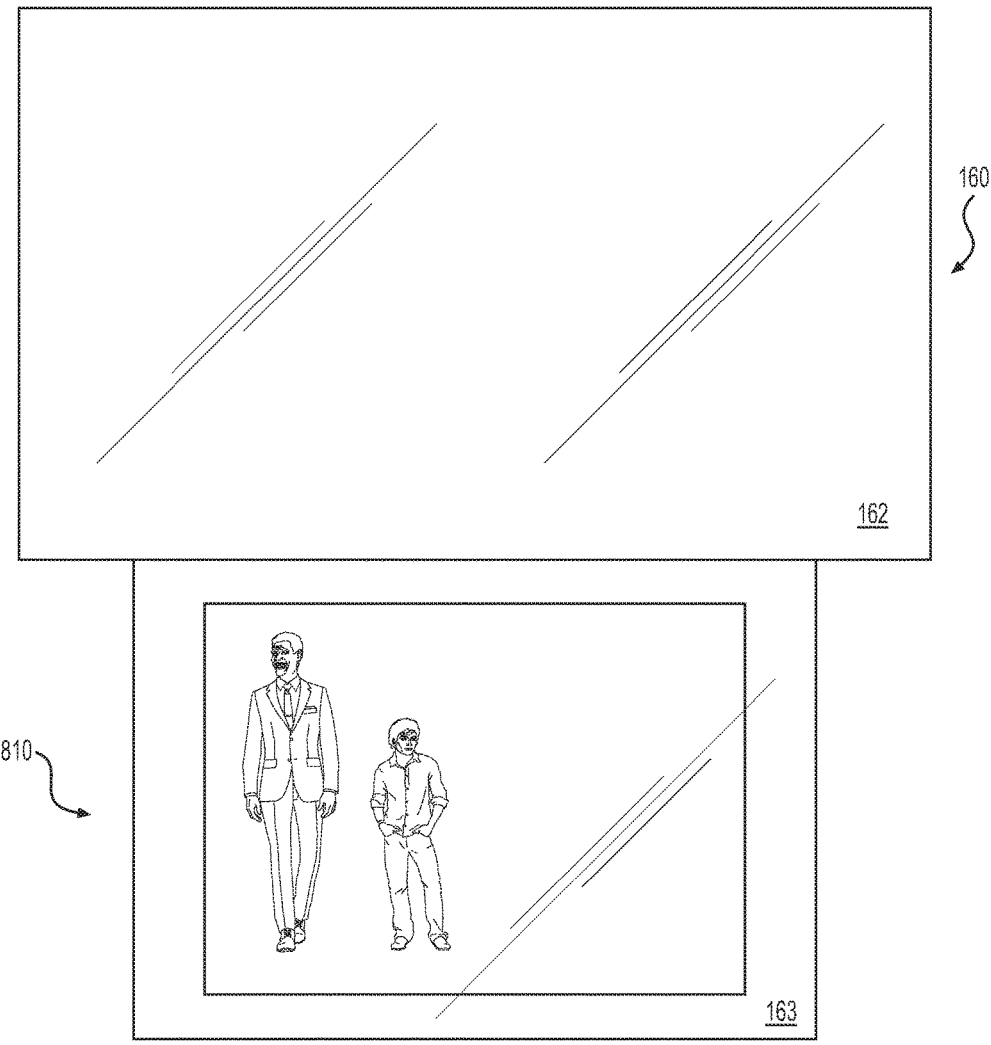

As shown in FIG. 8(c), data sourced from a cloud/network 802 may be predetermined to engage the second display 163. For example, as shown in FIG. 2, the sample lookup table 106 stores a correspondence with data sourced from the cloud/network 802 as being associated with the engagement. In FIG. 8(c), the second display 163 is now engaged, with a screen 810 being sourced from data 801 received from the cloud/network 802.

The examples of the different permutations shown with system 100 may be provided in its whole, partially, or with just one of the examples shown in any of methods 300, 400, or 500. The inclusion of one, some, or all of the concepts discussed above may be chosen via an implementer of the system 100.

Thus, employing the aspects disclosed herein, a dual display system 100 may be coupled with a dual display 160, capable of having two displays 162 and 163, with one of the screens hidden. The determination to engage, and the subsequent action to engage the second display 163 may occur independent of any action from a user or viewer of the dual display 160. Thus, by providing an automatic method to provide a dual display system which is determined dynamically based on the systems requirements and configurations, an enhanced user experience is provided.

Certain of the devices shown in FIGS. 1(a)-(d) include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3-5. The disclosed devices, components, and systems contemplate using or implementing any suitable technique for performing the steps illustrated in these figures. Thus, FIGS. 3-5 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for operating a multiple display assembly coupled to an electronic control unit (ECU), the multiple display assembly including a first display and a second display, comprising:
   an information receiver configured to receive information from the ECU;
   a display processor configured to determine whether to set the multiple display assembly in a first mode or a second mode,
   the first mode being defined as only the first display being visible; and
   the second mode being defined as the first display and the second display being visible; and
   an information processor configured to communicate the determination to the multiple display assembly,
   the information receiver is further configured to receive information about a source of the received information; and
   the display processor is further configured to determine whether to set the multiple display assembly's mode based the source correlating to a predetermined relationship
   the source is defined information from a network-connected source, wherein
   in response to data being received to be displayed via the network-connected source, the display processor being configured to be in the second mode.

2. The system according to claim 1, wherein the display processor is further configured to determine whether to set the multiple display assembly's mode based on the received information indicating a new application is to be executed by the ECU.

3. The system according to claim 1, wherein the display processor is further configured to determine whether to set the multiple display assembly's mode based on interface data received with the received information.

4. The system according to claim 1, wherein the first mode is defined as the first display completely obscuring the second display, and the second mode is defined as the second display being engaged via the communication from the information processor, with the second display being moved to a visible location.

5. The system according to claim 4, wherein the moving of the second display occurs independently of a user instruction.

* * * * *